(12) United States Patent
Kern et al.

(10) Patent No.: US 11,623,610 B2
(45) Date of Patent: Apr. 11, 2023

(54) VEHICULAR PURSUIT INTERVENTION SYSTEMS AND METHODS

(71) Applicant: Ford Global Technologies, LLC, Dearborn, MI (US)

(72) Inventors: Robert S. Kern, Eastpointe, MI (US); Jon Ohland, Northville, MI (US); Steve Skikun, Commerce Township, MI (US); Adam Rainey, Chicago, IL (US)

(73) Assignee: Ford Global Technologies, LLC, Dearborn, MI (US)

( * ) Notice: Subject to any disclaimer, the term of this patent is extended or adjusted under 35 U.S.C. 154(b) by 259 days.

(21) Appl. No.: 16/694,801

(22) Filed: Nov. 25, 2019

(65) Prior Publication Data

US 2021/0155201 A1 May 27, 2021

(51) Int. Cl.
| | |
|---|---|
| *B60R 25/10* | (2013.01) |
| *B60R 25/08* | (2006.01) |
| *B60R 25/00* | (2013.01) |
| *H04W 76/30* | (2018.01) |
| *B60W 10/18* | (2012.01) |

(Continued)

(52) U.S. Cl.
CPC ............ *B60R 25/08* (2013.01); *B60R 25/003* (2013.01); *B60R 25/04* (2013.01); *B60R 25/1001* (2013.01); *B60W 10/18* (2013.01); *B60W 10/30* (2013.01); *B60W 50/0098* (2013.01); *H04W 76/30* (2018.02)

(58) Field of Classification Search
CPC ......... B60R 25/00; B60R 25/10; B60R 25/04; B60R 15/1001; B60R 25/003; B60R 25/001–006; B60R 25/1001; B60R 25/08; B60R 25/018; B60R 25/0405; B60W 10/18; B60W 10/30; B60W 50/00; B60W 50/0098; H04W 76/30
USPC ....................................... 701/45; 340/539.11
See application file for complete search history.

(56) References Cited

U.S. PATENT DOCUMENTS

| | | | | |
|---|---|---|---|---|
| 5,694,335 | A | * 12/1997 | Hollenberg | ............. B60R 25/04 709/227 |
| 5,815,822 | A | 9/1998 | Iu | |
| 5,926,086 | A | 7/1999 | Escareno et al. | |
| 6,072,248 | A | * 6/2000 | Muise | ..................... B60R 25/04 340/426.12 |

(Continued)

FOREIGN PATENT DOCUMENTS

| | | | | |
|---|---|---|---|---|
| CA | 2335155 C | * 9/2009 | ............. | B60R 25/02 |
| CN | 107054291 A | * 8/2017 | ............. | B60R 25/24 |

(Continued)

OTHER PUBLICATIONS

Roman Mikulec, "Remote Shutdown of Heavy Duty Vehicles" Division of Industrial Electrical Engineering and Automation Faculty of Engineering, Lund University CODEN:LUTEDX/(TEIE-5255)/1-56(2012) (Year: 2012).*

(Continued)

*Primary Examiner* — Cuong H Nguyen
(74) *Attorney, Agent, or Firm* — Frank Lollo; Eversheds Sutherland (US) LLP

(57) ABSTRACT

Vehicular pursuit intervention systems and methods are provided herein. An example method includes determining unauthorized use of an emergency vehicle, causing the emergency vehicle to perform a controlled stop, locking access points of the emergency vehicle, closing windows of the emergency vehicle, and locking a weapon within the emergency vehicle.

17 Claims, 3 Drawing Sheets

(51) Int. Cl.
   *B60W 10/30*   (2006.01)
   *B60W 50/00*   (2006.01)
   *B60R 25/04*   (2013.01)

(56) References Cited

U.S. PATENT DOCUMENTS

| | | | |
|---|---|---|---|
| 6,313,740 B1 | 11/2001 | Goetz | |
| 6,549,130 B1 | 4/2003 | Joao | |
| 6,647,328 B2* | 11/2003 | Walker | B60R 25/33 701/2 |
| 6,717,511 B2 | 4/2004 | Parker, Jr. et al. | |
| 7,397,363 B2* | 7/2008 | Joao | B60R 25/33 340/428 |
| 7,636,033 B2* | 12/2009 | Golden | B60R 25/102 340/539.11 |
| 8,334,761 B2* | 12/2012 | Golden | G08B 15/00 340/426.11 |
| RE43,891 E* | 1/2013 | Golden | G08B 21/12 340/539.11 |
| RE43,990 E* | 2/2013 | Golden | B60R 25/018 340/539.11 |
| 8,531,280 B2* | 9/2013 | Golden | G08B 13/2491 340/426.11 |
| 8,660,709 B2* | 2/2014 | Harvey | B60R 25/04 701/1 |
| 9,046,374 B2 | 6/2015 | Ricci | |
| 9,096,189 B2* | 8/2015 | Golden | B60R 25/102 |
| 9,589,439 B2* | 3/2017 | Golden | G08B 15/00 |
| 10,163,287 B2* | 12/2018 | Golden | G08B 13/2491 |
| 10,984,619 B2* | 4/2021 | Golden | G08B 15/00 |
| 2002/0033637 A1* | 3/2002 | Fisher | B61L 3/125 303/20 |
| 2003/0006886 A1 | 1/2003 | Gabbard | |
| 2003/0016130 A1* | 1/2003 | Joao | B60R 25/33 340/13.24 |
| 2004/0049324 A1* | 3/2004 | Walker | B60W 50/029 701/1 |
| 2004/0107028 A1* | 6/2004 | Catalano | B64D 45/0059 701/2 |
| 2009/0240400 A1* | 9/2009 | Lachapelle | B60R 25/21 701/45 |
| 2010/0159983 A1* | 6/2010 | Golden | G08B 15/00 701/2 |
| 2011/0178655 A1* | 7/2011 | Golden | G08B 15/00 701/2 |
| 2013/0066525 A1* | 3/2013 | Tomik | B60W 50/0098 701/45 |
| 2015/0006035 A1* | 1/2015 | Ricci | B60Q 11/00 701/41 |
| 2016/0001741 A1* | 1/2016 | Fazi | B60R 25/241 701/2 |

FOREIGN PATENT DOCUMENTS

| | | | |
|---|---|---|---|
| EP | 1121245 B1 * | 12/2008 | B60R 25/02 |
| WO | WO-9965681 A1 * | 12/1999 | B60R 25/02 |

OTHER PUBLICATIONS

Cyber Threats Facing Autonomous and Connected Vehicles: Future Challenges Simon Parkinson, Paul Ward, Kyle Wilson, and Jonathan Miller, IEEE Transactions on Intelligent Transportation Systems, vol. 18, No. 11, Nov. 2017 (Year: 2017).*
Bruce Christianson et al's "Security Protocols", 7th International Workshop Cmbridge, UK, Apr. 1999 Proceedings. (Year: 1999).*
Armed and Dangerous: Tort Liability for the Negligent Storage of Firearms; by AJ McClurg—Conn. L. Rev., 1999—HeinOnline (Year: 1999).*
Storage practices of US gun owners in 2016; by CK Crifasi, ML Doucette . . .—. . . journal of public . . . 2018—ajph.aphapublications. org (Year: 2018).*
Security of Arms, Ammunition, and Explosives; A Regulation—2006—faph.isportsman.net (Year: 2006).*
Policy and technology for safer guns: an update; SP Teret, NL Lewin—Annals of emergency medicine, 2003—Elsevier (Year: 2003).*
"Cyber-physical systems security—A survey" by A Humayed, J Lin, F Li, B Luo—IEEE Internet of Things Journal, 2017—ieeexplore. ieee.org (Year: 2017).*
"Can you trust your fridge?" by A Grau—IEEE Spectrum, 2015—ieeexplore.ieee.org (Year: 2015).*
"Vehicular information & communications technology (VICT) system" by D Padi—2009 2nd International Conference on Adaptive . . . , 2009—ieeexplore.ieee.org (Year: 2009).*
"Consumer IoT: Security vulnerability case studies and solutions" by T Alladi, V Chamola, B Sikdar—IEEE Consumer, 2020; ieeexplore. ieee.org (Year: 2020).*
"Physical Security of Privately Owned Weapons and Ammunition"; FK Regulation—2015—Citeseer (Year: 2015).*
"Experimental security analysis of a modern automobile" by K Koscher, ACzeskis, F Roesne; IEEE symposium, 2010; ieeexplore. ieee.org (Year: 2010).*
SafeStop Vehicle Anti-Theft Systems, Pro-gard Products, LLC; Indianapolis, Apr. 15, 2010. (Year: 2010).*
"Rear Window Guards" by Pro-Gard; https://www.pro-gard.com/product/rea-window-guards/ (Year: 2021).*
"Safestop Vehicle Anti-theft System for Law Enforcement," Web page <https://www.safestopinc.com>, 2 pages, retrieved from the internet on Oct. 27, 2020.

\* cited by examiner

VEHICULAR PURSUIT INTERVENTION SYSTEMS AND METHODS

TECHNICAL FIELD

The present disclosure relates to vehicular control systems and methods, and more particularly, to systems and methods for remotely controlling vehicles into a safe condition that have been used in an unauthorized manner.

BACKGROUND

Unauthorized use of emergency vehicles, including police vehicles, may involve intervention to bring the vehicle to a stop. In some instances, the vehicle is stopped using an intervention referred to as a pursuit intervention technique (PIT). The PIT maneuver may potentially cause significant damage to a target vehicle as well as minor damage to a pursuing vehicle. In general, the PIT maneuver involves putting a target vehicle into a spin through vehicle-to-vehicle contact by a pursuing vehicle.

When the suspect unit is a stolen police unit, officers in pursuit currently have no way to securely and safely stop the vehicle without inflicting any damage. Depending on the surroundings a PIT maneuver may not be authorized. For example, the area may not be clear of potential high risk parameters once a suspect vehicle goes into a spin during the PIT maneuver. If the PIT maneuver is not authorized, officers may continue to pursue the target vehicle, which may increase a probability of damage to target vehicles, police vehicles, any other nearby vehicles, public property, and so forth. If a PIT maneuver is authorized, and if absolutely necessary, the pursuing officers may execute this maneuver to stop the vehicle at the expense of any and all damages incurred to the stolen police unit (e.g., target vehicle).

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein enable safe and effective remote vehicular control to slow or stop a vehicle that has been determined to be used in an unauthorized manner. For example, a vehicle, such as a police cruiser may be stolen by an individual. While the present disclosure provides example descriptions that may reference a police vehicle, the systems and methods disclosed herein can be used to safely and remotely control any emergency vehicle.

In some embodiments, an emergency vehicle can be configured to execute a remotely actuated procedure to bring the emergency vehicle into a controlled stop. The emergency vehicle can receive a signal to execute a controlled stop procedure from any remote service such as another emergency vehicle or a dispatch service.

The emergency vehicle can perform any number of operations that either individually or collectively cause the emergency vehicle to perform a controlled stop. Stated otherwise, the emergency vehicle can be configured to perform one or a number of actions that may bring the stolen unit to a secure and controlled stop and can be achieved by remotely sending a message to the Telematics Control Unit (TCU) of the emergency vehicle. The TCU may relay appropriate signals to other modules in order to perform the requested actions.

Examples of actions include, but are not limited to: reducing or removing throttle input and disabling throttle functionality; decreasing maximum speed of the emergency vehicle over a set time period (e.g. decrease by five mph every 30 seconds); activating visual or auditory systems, such as activating emergency flashers or pulsing an air horn tone warning to other drivers and pedestrians; enabling an Automatic Emergency Braking (AEB) system so the emergency vehicle can apply brakes automatically if an impending forward collision is detected; disabling AEB disable functionality; rolling up windows; enabling weapons locks; locking access points such as windows, doors, and hatches; disabling communications systems and functionalities; and/or initiating/applying brakes—just to name a few. These systems and methods can decrease a possibility of inflicting damage to a stolen police unit, as well as increase the safety of officers in pursuit.

ILLUSTRATIVE EMBODIMENTS

Figure 1:
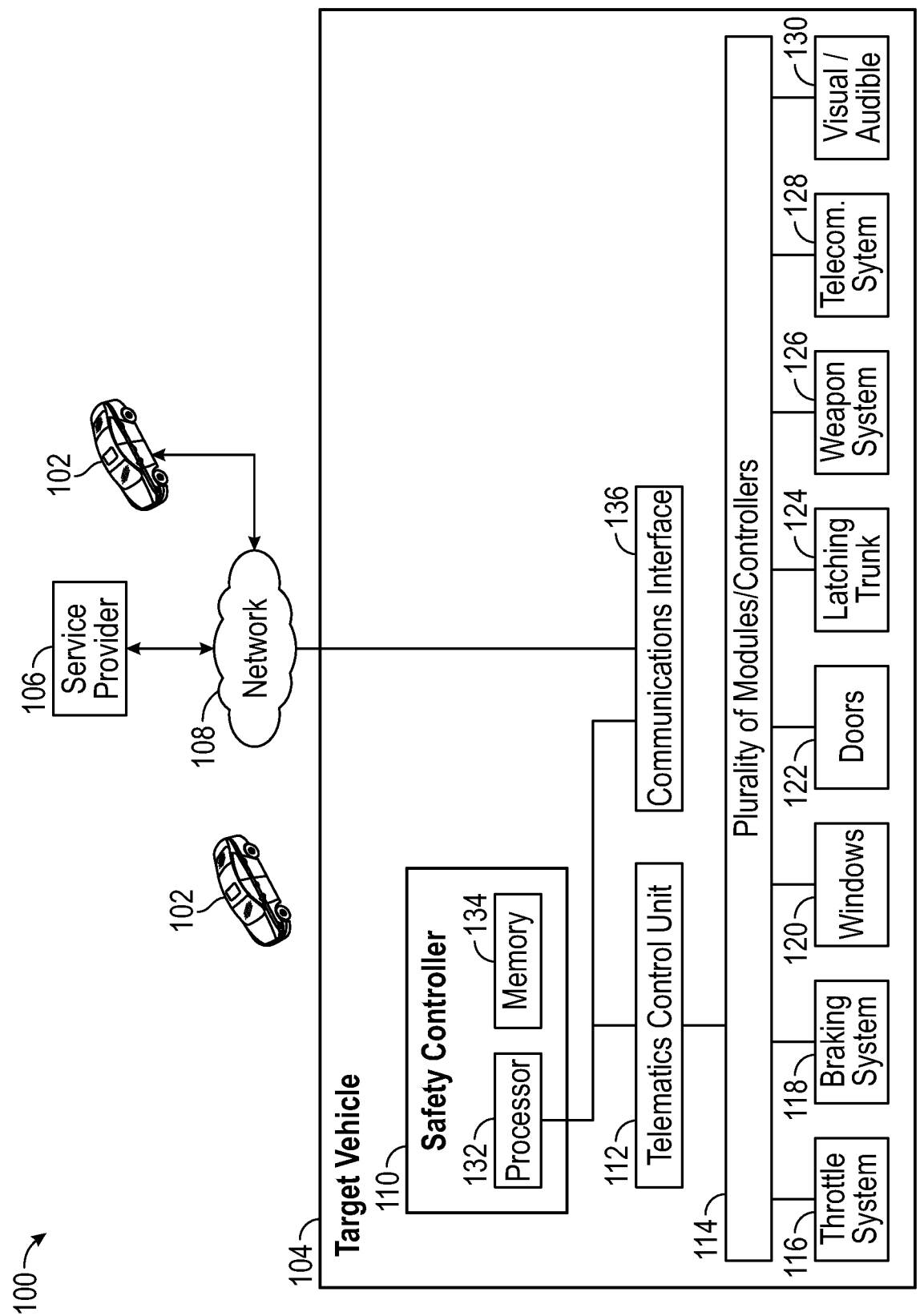
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The illustrative architecture 100 may include a target vehicle 102, a pursuit vehicle 104, and a service provider 106. The components of FIG. 1 can communicate with the target vehicle 102 over a network 108. The network 108 may include any one or a combination of multiple different types of networks, such as cable networks, the Internet, wireless networks, and other private and/or public networks. In some instances, the network 108 may include cellular, Wi-Fi, or Wi-Fi direct. The network 108 may include a short-range wireless as well, such as Bluetooth, Near Field Communications, and so forth.

According to some embodiments, the target vehicle 102 can comprise a safety controller 110, a telematics control unit 112, and a plurality of modules or controllers 114 that are linked to specific devices, components, or systems of the target vehicle 102. In general, the telematics control unit 112 can control individual devices, components, or systems of the target vehicle 102 through the plurality of modules or controllers 114. For example, the target vehicle 102 can comprise a throttle system 116, a braking system 118, windows 120, doors 122, latching trunk 124, weapon system 126, a telecommunications system 128, and visual and audible warning systems 130. In one specific example, the telematics control unit 112 can disable input received from a gas pedal of the target vehicle 102 through a module used to receive and relay input from the gas pedal of the target vehicle 102, which is used to cause corresponding changes in engine function (e.g., increase a speed of the vehicle).

While a safety controller has been described, the functionalities of the safety controller 110 described throughout can be implemented as application logic that can be executed by any suitable device or system within the target vehicle 102. For example, the safety controller application logic can be stored and executed by the telematics control unit 112.

The safety controller 110 may comprise a processor 132 and memory 134. The memory 134 stores instructions that are executed by the processor 132 to perform aspects as disclosed throughout. When referring to operations executed by the safety controller 110 it will be understood that this includes the execution of instructions by the processor 132.

The safety controller 110 can determine unauthorized use of the target vehicle 102. For example, the safety controller 110 can receive signals from the pursuit vehicle 104 or the service provider 106 that indicate that the safety controller 110 should perform a controlled stop procedure. In another example, the safety controller 110 receives a request to perform a controlled stop procedure from the pursuit vehicle 104. The pursuit vehicle 104 can transmit a signal to the target vehicle 102 using a communications interface 136 of the target vehicle 102.

In response to receiving signal(s) to execute a controlled stop, the safety controller 110 can execute a specific set of actions that are defined by the controlled stop procedure. The controlled stop procedure can include one or more actions performed by any of the systems of the vehicle 102, as directed by the telematics control unit 112. That is, the safety controller 110 can cause the telematics control unit 112 to control various vehicle features through the plurality of modules or controllers 114.

In general, the controlled stop procedure executed by the safety controller 110 can include one or more actions that are intended to slow the target vehicle 102 into a controlled stop. The actions included in a controlled stop procedure can include causing the throttle system 116 to reduce or eliminate throttle input or ignoring input that would cause the vehicle to accelerate in response to input. For example, the safety controller 110 can instruct the telematics control unit 112 to ignore throttle input such as when a driver pushes on a gas pedal of the target vehicle 102. Another example could include disabling the cruise control functionality of the target vehicle 102. Another action can include the telematics control unit 112 causing the windows 120 to roll up, as well as the doors 122 to lock. These actions enclose the driver in the target vehicle 102. In various embodiments, an action can include the telematics control unit 112 causing a latching trunk 124 to lock.

The controlled stop procedure can also include actions performed by two or more of these systems in series and/or parallel. For example, the controlled stop procedure may specify a controlled speed reduction process where the safety controller 110 instructs the telematics control unit 112 to reduce or deactivate input to the throttle system 116 and/or engage the braking system 118 to slow the vehicle to a stopping speed over a period of time. For example, the telematics control unit 112 can cause the throttle system 116 and/or the braking system 118 to reduce a speed of the target vehicle 102 in increments of five miles per hour each thirty seconds. Stated otherwise, the safety controller 110 can be configured to sequentially reduce a speed of the target vehicle by a predetermined amount over a period of time until the speed of the vehicle is approximately a stopping speed. The exact parameters of the controlled speed reduction process can be pre-determined or can be created on-the-fly through parameters selected by the pursuit vehicle 104 or the service provider 106. For example, a driver of the pursuit vehicle 104 can select the parameters of the controlled speed reduction process, which are then transmitted to the target vehicle 102. This feature allows the driver of the pursuit vehicle 104 to assess parameters of the pursuit situation and tailor the parameters of the controlled speed reduction process to suit. For example, the parameters of the controlled speed reduction process can be selected through input into a graphical user interface provided on a human machine input of the pursuit vehicle 104.

In an example use case, the target vehicle 102 can be slowed from 70 mph to five mph over a period of approximately six and a half minutes. A slow controlled reduction in speed ensures that other vehicles operating in the near vicinity of the target vehicle 102 are not endangered by an abrupt stopping of the target vehicle 102. While five mph has been provided as an example stopping speed, other stopping speed values can be utilized. In some embodiments, the vehicle speed reduction through braking may not require a reduction in speed to a stopping speed at all. When the target vehicle 102 has been slowed to five mph, the safety controller 110 can cause the telematics control unit 112 to fully apply the braking system 118 to stop the target vehicle 102.

According to some embodiments, the controlled stop procedure can include additional parameters related to preventing the driver of the target vehicle 102 from communicating or overhearing communications on telecommunications system 128. For example, the telecommunications system 128 can include a two-way police radio. The safety controller 110 can disable the telecommunications system 128 to prevent the driver from overhearing radio chatter that might provide the driver with information regarding the pursuit process that the driver could use to evade pursuing parties. The telecommunications system 128 can also include a Wi-Fi hotspot which can be disabled.

As noted above, a unique aspect of the present disclosure is ensuring safety of bystanders or other drivers. To these ends, a controlled stop procedure can include the safety controller 110 activating visual and audible warning systems 130 of the target vehicle 102. Examples of a visual warning system can include hazard lights, turn signals, or emergency lights. Examples of an audible warning system can include a siren, air horn, or rumble system.

A controlled stop procedure can include the safety controller 110 disabling an override feature of the target vehicle 102 that controls activation or deactivation of an automatic emergency braking system of the emergency vehicle, such as the braking system 118. To be sure, in some vehicles the braking system 118 is controlled separately from an automatic emergency braking system functionality. While these features may be used in combination, the safety controller 110 can be configured to control each of these systems or functionalities independently of one another (through indirect control using one or more of the plurality of modules or controllers 114). In some embodiments, a button is present on a console or other human machine interface of the target vehicle 102. The button can control enablement or disabling of the automatic emergency braking system functionality. In general, the automatic emergency braking system functionality can automatically slow a vehicle by engaging the braking system 118 when vehicle sensors determine an impending collision. A malicious actor may choose to disable this feature to prevent the vehicle from being slowed. Additionally, once the disabling feature is disabled, the safety controller 110 can be configured to enable the automatic emergency braking system functionality if it has been previously disabled.

The safety controller 110 can also be used to secure weapons in some embodiments. The weapon system 126 can include a dock or other similar apparatus that receives and secures a weapon such as a shotgun or rifle. When engaged, a weapon associated with the weapon system 126 may not be removed unless a locking mechanism of the weapon system 126 is unlocked. The safety controller 110 can be configured to ensure that the locking mechanism of the weapon system 126 is locked.

Figure 2:
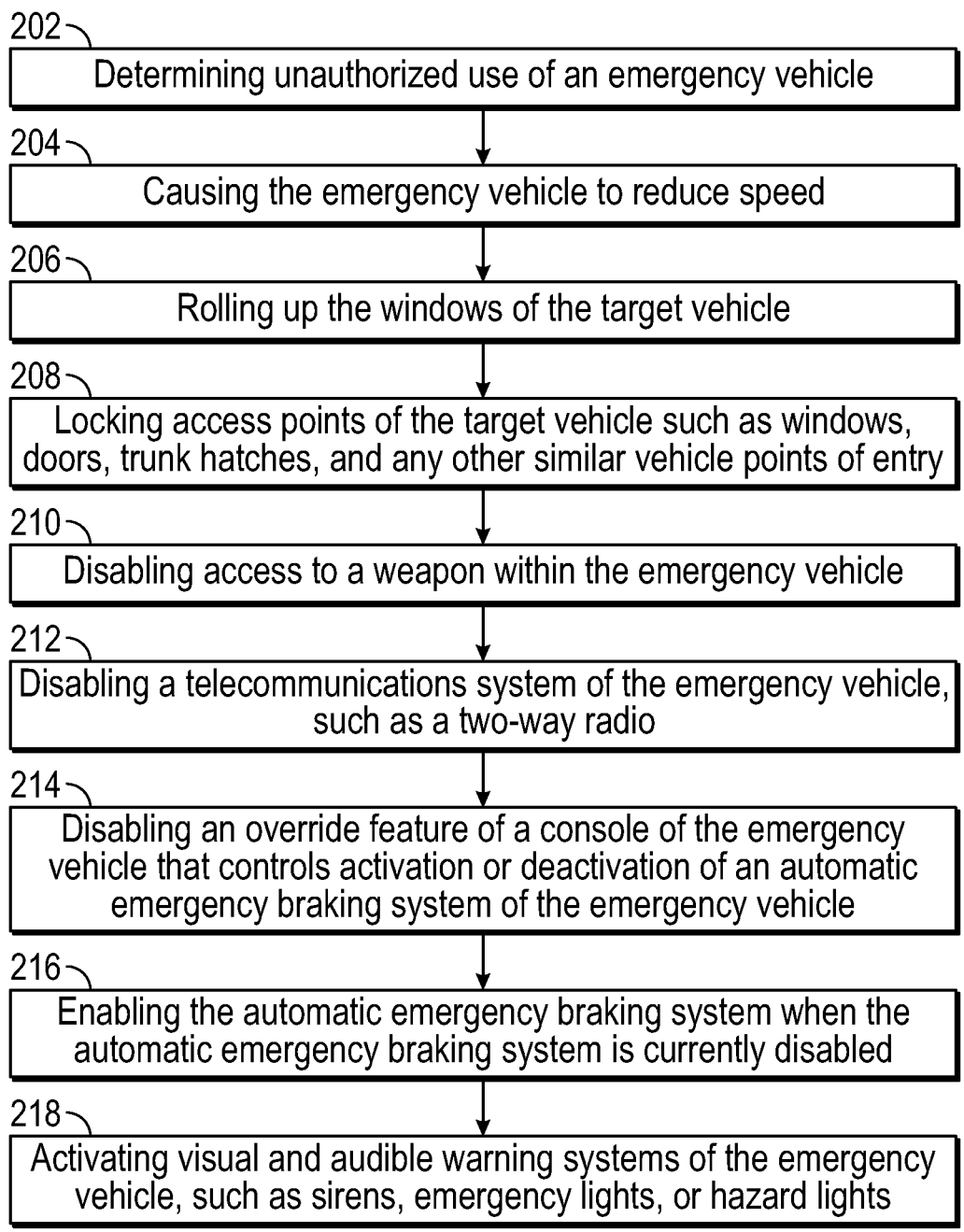
FIG. 2 is a flowchart of an example method of the present disclosure.

FIG. 2 is a flowchart of an example method of the present disclosure. The method can include a step 202 of determining unauthorized use of an emergency vehicle. As noted above, this can include a target vehicle receiving an indication that it has been used in an unauthorized manner. The method can include a step 204 of causing the emergency vehicle to perform a controlled reduction of speed. As noted above, this method step can include direct or indirect control of either or both of the throttle system and the braking system of the target vehicle. In addition to executing a process of slowing the target vehicle, the method can also include steps related to involuntarily securing the driver within the target vehicle. For example, the method can include a step 206 of rolling up the windows of the target vehicle, as well as a step 208 of locking access points of the target vehicle such as windows, doors, trunk hatches, and any other similar vehicle points of entry.

In furtherance of public safety, the method can include steps related to securing dangerous items within the target vehicle. For example, the method can include a step 210 of disabling access to a weapon within the emergency vehicle. As noted above, this can include engaging a lock of a weapons system of the target vehicle. In some embodiments, the locking mechanism of the weapons system can be disabled once in the locked configuration to prevent unlocking of an associated weapon.

Additional method steps can include a step 212 of disabling a telecommunications system of the emergency vehicle, such as a two-way radio. The method can include a step 214 of disabling an override feature of a console of the emergency vehicle that controls activation or deactivation of an automatic emergency braking system of the emergency vehicle, as well as a step 216 of enabling the automatic emergency braking system when the automatic emergency braking system is currently disabled. The method can include a step 218 of activating visual and audible warning systems of the emergency vehicle, such as sirens, emergency lights, or hazard lights.

It will be understood that the method steps in FIG. 2 are combinable together in any desired set of steps. Some controlled stopping procedures may have fewer or a greater number of steps than those described above. Also, the order in which the steps are executed can also vary. Some steps can be performed in parallel or in series, as would be understood by one of ordinary skill in the art.

Figure 3:
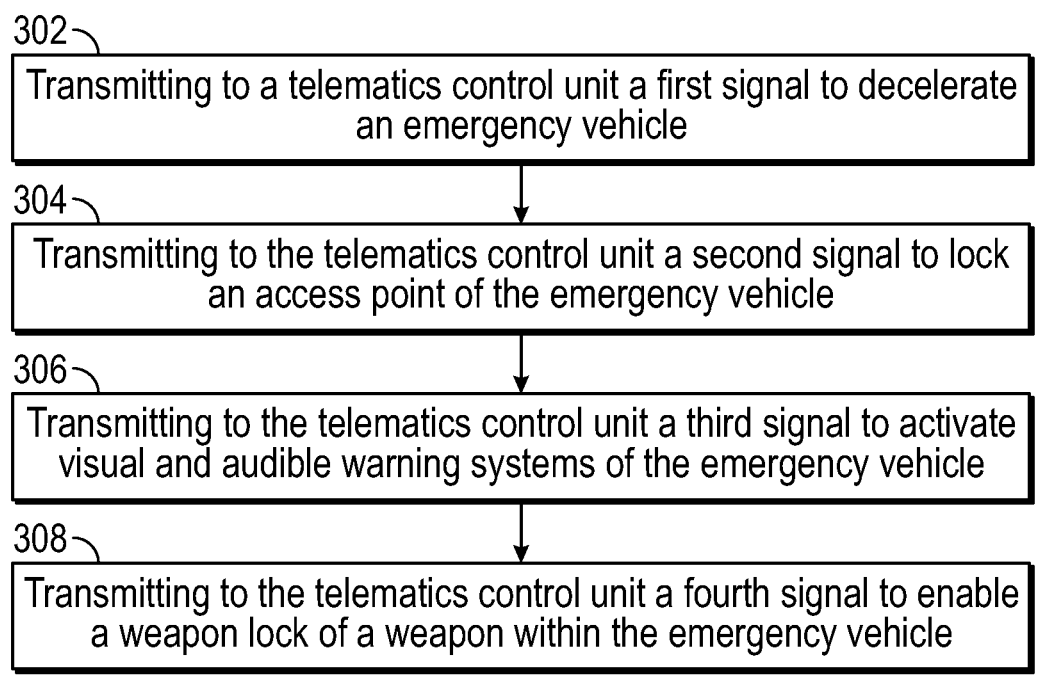
FIG. 3 is a flowchart of another example method of the present disclosure.

FIG. 3 is a flowchart of another example method executed by a safety controller (or safety controller application logic). The method can include a set of steps, which are referenced by individual signals that are generated by the safety controller. These steps can be passed to a TCU of a vehicle in order to cause various controllers or systems of the vehicle to respond. While the signals of the method steps are individually numbered, it will be understood that the numerical order of these steps is not intended to be limiting, but such numbering is provided only to ensure clarity of description.

The method can include a step 302 of transmitting to a telematics control unit a first signal to decelerate an emergency vehicle. In response, the TCU can further transmit additional signals that sequentially reduce a speed of the vehicle by a predetermined amount over a period of time until the speed of the vehicle is approximately a stopping speed. As noted above, this can include transmitting signals to a throttle system and/or a braking system of the vehicle.

Next, the method can include a step 304 of transmitting to the telematics control unit a second signal to lock an access point of the emergency vehicle. As noted above, this can include rolling up windows and locking doors of the vehicle, as well as a sunroof or trunk hatch. The method can also include a step 306 of transmitting to the telematics control unit a third signal to activate visual and audible warning systems of the emergency vehicle. In various embodiments, the method can include a step 308 of transmitting to the telematics control unit a fourth signal to enable a weapon lock of a weapon within the emergency vehicle.

A fifth signal can be used to disable a telecommunications system of the emergency vehicle. A sixth signal can be used to cause a braking system of the emergency vehicle to engage when a speed of the emergency vehicle is approximately a stopping speed. To be sure, the sixth signal can be used in conjunction with (or can be implicitly included within or otherwise triggers) the first signal. A seventh signal can be used to disable an override feature of a console of the emergency vehicle that controls activation or deactivation of an automatic emergency braking system of the emergency vehicle. An eighth signal can be used to enable the automatic emergency braking system if the automatic emergency braking system is currently disabled. A ninth signal can be used to activate visual and audible warning systems of the emergency vehicle. A tenth signal can be used to disable throttle input or throttle functionality for an emergency vehicle, along with an eleventh signal used to decrease a speed of the emergency vehicle incrementally over a period of time.

While the above method has been described as being executed at the level of a safety controller and/or TCU, the method can also be executed in conjunction with the service provider 106. For example, the service provider 106 can include a dispatch service or other related service that can cause the target vehicle to perform a controlled stop procedure remotely. In one embodiment, the service provider 106 can transmit an indication to the safety controller of the vehicle to execute a controlled stop procedure.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
   determining, by an emergency vehicle or a remote server, an unauthorized use of the emergency vehicle;
   activating, by a telematics control unit (TCU) of the emergency vehicle and based on the unauthorized use of the emergency vehicle, a visual warning system of the emergency vehicle and an audible warning system of the emergency vehicle, wherein the visual warning system comprises at least one of a hazard light and a turn signal, and wherein the audible warning system comprises a rumble system;
   causing, by the TCU of the emergency vehicle and based on the unauthorized use of the emergency vehicle, the emergency vehicle to perform a controlled stop;
   securing, by the TCU of the emergency vehicle and based on the unauthorized use of the emergency vehicle, an unauthorized user of the emergency vehicle within the emergency vehicle, comprising:
      locking, by the TCU and based on the unauthorized use of the emergency vehicle, one or more access points of the emergency vehicle; and
      closing, by the TCU and based on the unauthorized use of the emergency vehicle, one or more windows of the emergency vehicle;
   locking, by the TCU and based on the unauthorized use of the emergency vehicle, a weapon within a weapon system in the emergency vehicle; and
   disabling, by the TCU and based on the unauthorized use of the emergency vehicle, a telecommunications system of the emergency vehicle, wherein the telecommunications system comprises a two-way police radio.

2. A method, comprising:
   determining, by an emergency vehicle or a remote server, an unauthorized use of the emergency vehicle;
   transmitting, by the emergency vehicle or the remote server, to a telematics control unit, and based on the unauthorized use of the emergency vehicle, a first signal to decelerate the emergency vehicle;
   transmitting, by the emergency vehicle or the remote server, to the telematics control unit, and based on the unauthorized use of the emergency vehicle, a second signal to secure an unauthorized user of the emergency vehicle within the emergency vehicle, wherein securing the unauthorized user within the emergency vehicle comprises:
      locking an access point of the emergency vehicle; and
      closing a window of the emergency vehicle;
   transmitting, by the emergency vehicle or the remote server, to the telematics control unit, and based on the unauthorized use of the emergency vehicle, a third signal to activate a visual warning system of the emergency vehicle and an audible warning system of the emergency vehicle, wherein the visual warning system comprises at least one of a hazard light and a turn signal, and wherein the audible warning system comprises a rumble system;
   transmitting, by the emergency vehicle or the remote server, to the telematics control unit, and based on the unauthorized use of the emergency vehicle, a fourth signal to enable a weapon lock of a weapon within a weapon system in the emergency vehicle; and
   transmitting, by the emergency vehicle or the remote server, to the telematics control unit, and based on the unauthorized use of the emergency vehicle, a fifth signal to disable a telecommunications system of the emergency vehicle, wherein the telecommunications system comprises a two-way police radio.

3. The method according to claim 1, wherein causing the emergency vehicle to perform a controlled stop comprises sequentially reducing a speed of the emergency vehicle by a predetermined amount over a period of time until the speed of the emergency vehicle is approximately a stopping speed.

4. The method according to claim 3, wherein causing the emergency vehicle to perform a controlled stop further comprises causing a braking system of the emergency vehicle to engage when the speed of the emergency vehicle is reduced to approximately the stopping speed.

5. The method according to claim 1, further comprising:
   disabling, via a first signal, an override feature of a console of the emergency vehicle that controls activation or deactivation of an automatic emergency braking system of the emergency vehicle; or
   enabling, via a second signal, the automatic emergency braking system when the automatic emergency braking system is currently disabled.

6. The method of claim 1, wherein the visual warning system further comprises an emergency light, and wherein the audible warning system further comprises at least one of a siren and an air horn.

7. The method according to claim 1, wherein causing the emergency vehicle to perform a controlled stop comprises:
   disabling a throttle input or a throttle functionality for the emergency vehicle that causes the emergency vehicle to accelerate; and
   decreasing a speed of the emergency vehicle incrementally over a period of time.

8. A device, comprising:
   a processor; and
   a memory for storing instructions, the processor executing the instructions to:
      determine an unauthorized use of an emergency vehicle;
      activate, based on the unauthorized use of the emergency vehicle, a visual warning system of the emergency vehicle and an audible warning system of the emergency vehicle,
      wherein the visual warning system comprises at least one of a hazard light and a turn signal, and wherein the audible warning system comprises a rumble system;
      decelerate, based on the unauthorized use of the emergency vehicle, the emergency vehicle;
      secure, based on the unauthorized use of the emergency vehicle, an unauthorized user of the emergency vehicle within the emergency vehicle by:
         locking, based on the unauthorized use of the emergency vehicle, an access point of the emergency vehicle; and
         closing, based on the unauthorized use of the emergency vehicle, a window of the emergency vehicle;
      prevent access to, based on the unauthorized use of the emergency vehicle, a weapon by locking a weapon system within the emergency vehicle; and
      disable, based on the unauthorized use of the emergency vehicle, a telecommunications system of the emergency vehicle, wherein the telecommunications system comprises a two-way police radio.

9. The device according to claim 8, wherein the processor is further configured to determine the unauthorized use of the emergency vehicle based on a signal received from another vehicle or a service provider.

10. The device according to claim 8, wherein the processor decelerates the emergency vehicle by transmitting deceleration instructions to a telematics control unit of the emergency vehicle.

11. The method according to claim 2, further comprising transmitting, by the emergency vehicle or the remote server, to the telematics control unit, and based on the unauthorized use of the emergency vehicle, a sixth signal to cause a braking system of the emergency vehicle to engage when a speed of the emergency vehicle is reduced to approximately a stopping speed.

12. The device according to claim 8, wherein the processor is further configured to cause the emergency vehicle to perform a controlled stop by sequentially reducing a speed of the emergency vehicle by a predetermined amount over a period of time until the speed of the emergency vehicle is approximately a stopping speed.

13. The device according to claim 12, wherein the processor is further configured to cause the emergency vehicle to perform the controlled stop by causing a braking system of the emergency vehicle to engage when the speed of the emergency vehicle is reduced to approximately a stopping speed.

14. The device according to claim 8, wherein the processor is further configured to
disable, via a first signal, an override feature of a console of the emergency vehicle that controls activation or deactivation of an automatic emergency braking system of the emergency vehicle; and
enable, via a second signal, the automatic emergency braking system when the automatic emergency braking system is currently disabled.

15. The method according to claim 11, further comprising:
transmitting, by the emergency vehicle or the remote server, to the telematics control unit, and based on the unauthorized use of the emergency vehicle, a seventh signal to disable an override feature of a console of the emergency vehicle that controls activation or deactivation of an automatic emergency braking system of the emergency vehicle; and
transmitting, by the emergency vehicle or the remote server, to the telematics control unit, and based on the unauthorized use of the emergency vehicle, an eighth signal to enable the automatic emergency braking system if the automatic emergency braking system is currently disabled.

16. The method according to claim 15, further comprising transmitting, by the emergency vehicle or the remote server, to the telematics control unit, and based on the unauthorized use of the emergency vehicle, a ninth signal to disable a throttle input or a throttle functionality for the emergency vehicle that causes the emergency vehicle to accelerate.

17. The method according to claim 16, further comprising transmitting, by the emergency vehicle or the remote server, to the telematics control unit, and based on the unauthorized use of the emergency vehicle, a tenth signal to decrease a speed of the emergency vehicle incrementally over a period of time.

* * * * *